(12) United States Patent
Grundmueller et al.

(10) Patent No.: US 11,697,178 B2
(45) Date of Patent: Jul. 11, 2023

(54) METHODS AND APPARATUSES FOR LASER PROCESSING MATERIALS

(71) Applicant: Corning Incorporated, Corning, NY (US)

(72) Inventors: Richard Grundmueller, Lengenwang (DE); Frank Fabian Herrnberger, Munich (DE); Michael Klein, Gilching (DE); Florian Spaeth, Eching (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/727,083

(22) Filed: Oct. 6, 2017

(65) Prior Publication Data
US 2018/0029165 A1    Feb. 1, 2018

Related U.S. Application Data

(62) Division of application No. 14/794,181, filed on Jul. 8, 2015, now Pat. No. 9,815,144.
(Continued)

(51) Int. Cl.
*B23K 26/70* (2014.01)
*C03B 33/09* (2006.01)
(Continued)

(52) U.S. Cl.
CPC ........ *B23K 26/706* (2015.10); *B23K 26/0006* (2013.01); *B23K 26/57* (2015.10);
(Continued)

(58) Field of Classification Search
CPC ... C03B 33/022; C03B 33/082; C03B 33/091; C03B 33/102; B23K 26/706; B23K 26/57; B23K 26/0006
See application file for complete search history.

(56) References Cited

U.S. PATENT DOCUMENTS

| 1,529,243 A | 3/1925 | Drake et al. |
|---|---|---|
| 1,626,396 A | 4/1927 | Drake |

(Continued)

FOREIGN PATENT DOCUMENTS

| CN | 1259924 A | 7/2000 |
|---|---|---|
| CN | 2388062 Y | 7/2000 |

(Continued)

OTHER PUBLICATIONS

JP 2013-132664 machine translation, Processing method for Object, Iwatsubo et al., Jul. 2013 (Year: 2013).*
(Continued)

*Primary Examiner* — Queenie S Dehghan
(74) *Attorney, Agent, or Firm* — Kevin L. Bray; Svetlana Z. Short

(57) ABSTRACT

Methods of laser processing a transparent material are disclosed. The method may include positioning the transparent material on a carrier and transmitting a laser beam through the transparent material, where the laser beam may be incident on a side of the transparent material opposite the carrier. The transparent material may be substantially transparent to the laser beam and the carrier may include a support base and a laser disruption element. The laser disruption element may disrupt the laser beam transmitted through the transparent material such that the laser beam may not have sufficient intensity below the laser disruption element to damage the support base.

4 Claims, 1 Drawing Sheet

Related U.S. Application Data

(60) Provisional application No. 62/021,917, filed on Jul. 8, 2014.

(51) Int. Cl.
*B23K 26/57* (2014.01)
*B23K 26/00* (2014.01)
*C03B 33/02* (2006.01)
*C03B 33/10* (2006.01)
*C03B 33/08* (2006.01)
*B23K 103/00* (2006.01)

(52) U.S. Cl.
CPC ........ *B23K 26/702* (2015.10); *C03B 33/0222* (2013.01); *C03B 33/082* (2013.01); *C03B 33/091* (2013.01); *C03B 33/102* (2013.01); *B23K 2103/54* (2018.08); *B23K 2103/56* (2018.08)

(56) References Cited

U.S. PATENT DOCUMENTS

| | | |
|---|---|---|
| 1,790,397 A | 1/1931 | Woods et al. |
| 2,682,134 A | 6/1954 | Stookey |
| 2,749,794 A | 6/1956 | O'Leary |
| 2,754,956 A | 7/1956 | Sommer |
| 3,647,410 A | 3/1972 | Heaton et al. |
| 3,673,900 A | 7/1972 | Jendrisak et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 3,947,093 A | 3/1976 | Goshima et al. |
| 4,076,159 A | 2/1978 | Farragher |
| 4,226,607 A | 10/1980 | Domken |
| 4,441,008 A | 4/1984 | Chan |
| 4,546,231 A | 10/1985 | Gresser et al. |
| 4,618,056 A | 10/1986 | Cutshall |
| 4,623,776 A | 11/1986 | Buchroeder et al. |
| 4,642,439 A | 2/1987 | Miller et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,951,457 A | 8/1990 | Deal |
| 4,997,250 A | 3/1991 | Ortiz, Jr. |
| 5,035,918 A | 7/1991 | Vyas |
| 5,040,182 A | 8/1991 | Spinelli et al. |
| 5,104,210 A | 4/1992 | Tokas |
| 5,104,523 A | 4/1992 | Masaharu et al. |
| 5,108,857 A | 4/1992 | Kitayama et al. |
| 5,112,722 A | 5/1992 | Tsujino et al. |
| 5,114,834 A | 5/1992 | Nachshon |
| 5,221,034 A | 6/1993 | Bando |
| 5,256,853 A | 10/1993 | McIntyre |
| 5,265,107 A | 11/1993 | Delfyett |
| 5,326,956 A | 7/1994 | Lunney |
| 5,400,350 A | 3/1995 | Galvanauskas et al. |
| 5,410,567 A | 4/1995 | Brundage et al. |
| 5,418,803 A | 5/1995 | Zhiglinsky et al. |
| 5,434,875 A | 7/1995 | Rieger et al. |
| 5,436,925 A | 7/1995 | Lin et al. |
| 5,475,197 A | 12/1995 | Wrobel et al. |
| 5,521,352 A | 5/1996 | Lawson |
| 5,541,774 A | 7/1996 | Blankenbecler |
| 5,553,093 A | 9/1996 | Ramaswamy et al. |
| 5,574,597 A | 11/1996 | Kataoka et al. |
| 5,578,229 A | 11/1996 | Barnekov et al. |
| 5,586,138 A | 12/1996 | Yokoyama |
| 5,656,186 A | 8/1997 | Mourou et al. |
| 5,676,866 A | 10/1997 | In Den Baumen et al. |
| 5,684,642 A | 11/1997 | Zumoto et al. |
| 5,692,703 A | 12/1997 | Murphy et al. |
| 5,696,782 A | 12/1997 | Harter et al. |
| 5,715,346 A | 2/1998 | Liu |
| 5,736,061 A | 4/1998 | Fukada et al. |
| 5,736,709 A | 4/1998 | Neiheisel |
| 5,776,220 A | 7/1998 | Allaire et al. |
| 5,781,684 A | 7/1998 | Liu |
| 5,796,112 A | 8/1998 | Ichie |
| 5,854,490 A | 12/1998 | Ooaeh et al. |
| 5,854,751 A | 12/1998 | Di et al. |
| 5,878,866 A | 3/1999 | Lisec |
| 5,968,441 A | 10/1999 | Seki |
| 6,003,418 A | 12/1999 | Bezama et al. |
| 6,016,223 A | 1/2000 | Suzuki et al. |
| 6,016,324 A | 1/2000 | Rieger et al. |
| 6,027,062 A | 2/2000 | Bacon et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,137,632 A | 10/2000 | Bernacki |
| 6,156,030 A | 12/2000 | Neev |
| 6,160,835 A | 12/2000 | Kwon |
| 6,185,051 B1 | 2/2001 | Chen et al. |
| 6,186,384 B1 | 2/2001 | Sawada |
| 6,191,880 B1 | 2/2001 | Schuster |
| 6,210,401 B1 | 4/2001 | Lai |
| 6,256,328 B1 | 7/2001 | Delfyett et al. |
| 6,259,058 B1 | 7/2001 | Hoekstra |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,461,223 B1 | 10/2002 | Bando |
| 6,484,052 B1 | 11/2002 | Visuri et al. |
| 6,489,589 B1 | 12/2002 | Alexander |
| 6,501,576 B1 | 12/2002 | Seacombe |
| 6,501,578 B1 | 12/2002 | Bernstein et al. |
| 6,520,057 B1 | 2/2003 | Steadman |
| 6,552,301 B2 | 4/2003 | Herman et al. |
| 6,573,026 B1 | 6/2003 | Aitken et al. |
| 6,592,703 B1 | 7/2003 | Habeck et al. |
| 6,611,647 B2 | 8/2003 | Berkey et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,151 B1 | 5/2004 | Thompson |
| 6,729,161 B1 | 5/2004 | Miura et al. |
| 6,737,345 B1 | 5/2004 | Lin et al. |
| 6,744,009 B1 | 6/2004 | Xuan et al. |
| 6,787,732 B1 | 9/2004 | Xuan et al. |
| 6,791,935 B2 | 9/2004 | Hatano et al. |
| 6,800,237 B1 | 10/2004 | Yamamoto et al. |
| 6,800,831 B1 | 10/2004 | Hoetzel |
| 6,856,379 B2 | 2/2005 | Schuster |
| 6,885,502 B2 | 4/2005 | Schuster |
| 6,904,218 B2 | 6/2005 | Sun et al. |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,102,118 B2 | 9/2006 | Acker et al. |
| 7,187,833 B2 | 3/2007 | Mishra |
| 7,196,841 B2 | 3/2007 | Melzer et al. |
| 7,259,354 B2 | 8/2007 | Pailthorp et al. |
| 7,353,829 B1 | 4/2008 | Wachter et al. |
| 7,402,773 B2 | 7/2008 | Nomaru |
| 7,408,616 B2 | 8/2008 | Gruner et al. |
| 7,408,622 B2 | 8/2008 | Fiolka et al. |
| 7,511,886 B2 | 3/2009 | Schultz et al. |

(56) References Cited

U.S. PATENT DOCUMENTS

| | | |
|---|---|---|
| 7,535,634 B1 | 5/2009 | Savchenkov et al. |
| 7,555,187 B2 | 6/2009 | Bickham et al. |
| 7,565,820 B2 | 7/2009 | Foster et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 7,794,904 B2 | 9/2010 | Brueck |
| 7,800,734 B2 | 9/2010 | Komatsuda |
| 7,832,675 B2 | 11/2010 | Bumgarner et al. |
| 7,901,967 B2 | 3/2011 | Komura et al. |
| 7,920,337 B2 | 4/2011 | Perchak |
| 7,978,408 B2 | 7/2011 | Sawabe et al. |
| 8,035,803 B2 | 10/2011 | Fiolka |
| 8,035,882 B2 | 10/2011 | Fanton et al. |
| 8,035,901 B2 | 10/2011 | Abramov et al. |
| 8,041,127 B2 | 10/2011 | Whitelaw |
| 8,068,279 B2 | 11/2011 | Schuster et al. |
| 8,104,385 B2 | 1/2012 | Hayashi |
| 8,118,971 B2 | 2/2012 | Hori et al. |
| 8,123,515 B2 | 2/2012 | Schleelein |
| 8,132,427 B2 | 3/2012 | Brown et al. |
| 8,144,308 B2 | 3/2012 | Muramatsu |
| 8,158,514 B2 | 4/2012 | Krueger et al. |
| 8,164,818 B2 | 4/2012 | Collins et al. |
| 8,168,514 B2 | 5/2012 | Garner et al. |
| 8,194,170 B2 | 6/2012 | Golub et al. |
| 8,211,259 B2 | 7/2012 | Sato et al. |
| 8,218,929 B2 | 7/2012 | Bickham et al. |
| 8,237,918 B2 | 8/2012 | Totzeck et al. |
| 8,245,539 B2 | 8/2012 | Lu et al. |
| 8,245,540 B2 | 8/2012 | Abramov et al. |
| 8,248,600 B2 | 8/2012 | Matousek et al. |
| 8,259,393 B2 | 9/2012 | Fiolka et al. |
| 8,269,138 B2 | 9/2012 | Garner et al. |
| 8,279,524 B2 | 10/2012 | Fiolka et al. |
| 8,283,595 B2 | 10/2012 | Fukuyo et al. |
| 8,283,695 B2 | 10/2012 | Salcedo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,339,578 B2 | 12/2012 | Omura |
| 8,341,976 B2 | 1/2013 | Dejneka et al. |
| 8,347,551 B2 | 1/2013 | Van Der Drift |
| 8,347,651 B2 | 1/2013 | Abramov et al. |
| 8,358,868 B2 | 1/2013 | Iketani |
| 8,358,888 B2 | 1/2013 | Ramachandran |
| 8,379,188 B2 | 2/2013 | Mueller et al. |
| 8,444,905 B2 | 5/2013 | Li et al. |
| 8,444,906 B2 | 5/2013 | Lee et al. |
| 8,448,471 B2 | 5/2013 | Kumatani et al. |
| 8,475,507 B2 | 7/2013 | Dewey et al. |
| 8,482,717 B2 | 7/2013 | Fiolka et al. |
| 8,491,983 B2 | 7/2013 | Ono et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,857 B2 | 1/2014 | Crosbie |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,687,932 B2 | 4/2014 | Peckham et al. |
| 8,697,228 B2 | 4/2014 | Carre |
| 8,720,228 B2 | 5/2014 | Li |
| 8,724,937 B2 | 5/2014 | Barwicz et al. |
| 8,826,696 B2 | 9/2014 | Brown et al. |
| 8,847,112 B2 | 9/2014 | Panarello et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,028,613 B2 | 5/2015 | Kim et al. |
| 9,052,605 B2 | 6/2015 | Van et al. |
| 9,086,509 B2 | 7/2015 | Knutson |
| 9,138,913 B2 | 9/2015 | Arai et al. |
| 9,170,500 B2 | 10/2015 | Van et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,341,912 B2 | 5/2016 | Shrivastava et al. |
| 9,346,706 B2 | 5/2016 | Bazemore et al. |
| 9,446,590 B2 | 9/2016 | Chen et al. |
| 9,477,037 B1 | 10/2016 | Bickham et al. |
| 9,481,598 B2 | 11/2016 | Bergh |
| 9,499,343 B2 | 11/2016 | Cornelissen et al. |
| 9,517,929 B2 | 12/2016 | Hosseini |
| 9,517,963 B2 | 12/2016 | Marjanovic et al. |
| 9,701,581 B2 | 7/2017 | Kangastupa et al. |
| 9,703,167 B2 | 7/2017 | Parker et al. |
| 9,815,730 B2 | 11/2017 | Marjanovic et al. |
| 9,850,160 B2 | 12/2017 | Marjanovic et al. |
| 9,873,628 B1 | 1/2018 | Haloui et al. |
| 9,878,304 B2 | 1/2018 | Kotake et al. |
| 10,190,363 B2 | 1/2019 | Behmke et al. |
| 10,730,783 B2 | 8/2020 | Akarapu et al. |
| 2001/0019404 A1 | 9/2001 | Schuster et al. |
| 2001/0027842 A1 | 10/2001 | Curcio et al. |
| 2002/0006765 A1 | 1/2002 | Michel et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0097488 A1 | 7/2002 | Hay et al. |
| 2002/0110639 A1 | 8/2002 | Bruns |
| 2002/0126380 A1 | 9/2002 | Schuster |
| 2002/0139786 A1 | 10/2002 | Amako et al. |
| 2003/0006221 A1 | 1/2003 | Hong et al. |
| 2003/0007772 A1 | 1/2003 | Borrelli et al. |
| 2003/0007773 A1 | 1/2003 | Kondo et al. |
| 2003/0038225 A1 | 2/2003 | Mulder et al. |
| 2003/0070706 A1* | 4/2003 | Fujioka ............... H01L 31/048 136/251 |
| 2003/0227663 A1 | 12/2003 | Agrawal et al. |
| 2004/0051982 A1 | 3/2004 | Perchak |
| 2004/0108467 A1 | 6/2004 | Eurlings et al. |
| 2004/0144231 A1 | 7/2004 | Hanada |
| 2004/0021615 A1 | 11/2004 | Postupack et al. |
| 2004/0218882 A1 | 11/2004 | Bickham et al. |
| 2004/0221615 A1 | 11/2004 | Postupack et al. |
| 2004/0228593 A1 | 11/2004 | Sun et al. |
| 2005/0024743 A1 | 2/2005 | Camy-Peyret |
| 2005/0098458 A1 | 5/2005 | Gruetzmacher et al. |
| 2005/0098548 A1 | 5/2005 | Kobayashi et al. |
| 2005/0115938 A1 | 6/2005 | Sawaki et al. |
| 2005/0116938 A1 | 6/2005 | Ito et al. |
| 2005/0205778 A1 | 9/2005 | Kitai et al. |
| 2005/0209898 A1 | 9/2005 | Asai et al. |
| 2005/0231651 A1 | 10/2005 | Myers et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0021385 A1 | 2/2006 | Cimo et al. |
| 2006/0028706 A1 | 2/2006 | Totzeck et al. |
| 2006/0028728 A1 | 2/2006 | Li |
| 2006/0050261 A1 | 3/2006 | Brotsack |
| 2006/0109874 A1 | 5/2006 | Shiozaki et al. |
| 2006/0118529 A1 | 6/2006 | Aoki et al. |
| 2006/0127679 A1 | 6/2006 | Gulati et al. |
| 2006/0146384 A1 | 7/2006 | Schultz et al. |
| 2006/0151450 A1 | 7/2006 | You et al. |
| 2006/0170617 A1 | 8/2006 | Latypov et al. |
| 2006/0213883 A1 | 9/2006 | Eberhardt et al. |
| 2006/0227440 A1 | 10/2006 | Glukstad |
| 2006/0266744 A1 | 11/2006 | Nomaru |
| 2006/0289410 A1 | 12/2006 | Morita et al. |
| 2006/0291835 A1 | 12/2006 | Nozaki et al. |

(56) References Cited

U.S. PATENT DOCUMENTS

| | | |
|---|---|---|
| 2007/0021548 A1 | 1/2007 | Hattori et al. |
| 2007/0030471 A1 | 2/2007 | Troost et al. |
| 2007/0044606 A1 | 3/2007 | Kang et al. |
| 2007/0045253 A1 | 3/2007 | Jordens et al. |
| 2007/0051706 A1 | 3/2007 | Bovatsek et al. |
| 2007/0053632 A1 | 3/2007 | Popp |
| 2007/0068648 A1 | 3/2007 | Hu et al. |
| 2007/0090180 A1 | 4/2007 | Griffis et al. |
| 2007/0091977 A1 | 4/2007 | Sohn et al. |
| 2007/0111119 A1 | 5/2007 | Hu et al. |
| 2007/0111390 A1 | 5/2007 | Komura et al. |
| 2007/0111480 A1* | 5/2007 | Maruyama ............ B28D 5/0011 438/463 |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0209029 A1 | 9/2007 | Ivonin et al. |
| 2007/0228616 A1* | 10/2007 | Bang .................... B23K 26/046 264/405 |
| 2007/0298529 A1 | 12/2007 | Maeda et al. |
| 2008/0000884 A1 | 1/2008 | Sugiura et al. |
| 2008/0050584 A1 | 2/2008 | Noguchi et al. |
| 2008/0079940 A1 | 4/2008 | Sezerman et al. |
| 2008/0087629 A1 | 4/2008 | Shimomura et al. |
| 2008/0099444 A1 | 5/2008 | Misawa et al. |
| 2008/0158529 A1 | 7/2008 | Hansen |
| 2008/0165925 A1 | 7/2008 | Singer et al. |
| 2008/0190981 A1 | 8/2008 | Okajima et al. |
| 2008/0239268 A1 | 10/2008 | Mulder et al. |
| 2008/0309902 A1 | 12/2008 | Rosenbluth |
| 2008/0310465 A1 | 12/2008 | Achtenhagen |
| 2008/0314879 A1 | 12/2008 | Bruland et al. |
| 2008/0318028 A1 | 12/2008 | Winstanley et al. |
| 2009/0013724 A1 | 1/2009 | Koyo et al. |
| 2009/0032510 A1 | 2/2009 | Ando et al. |
| 2009/0033902 A1 | 2/2009 | Mulder et al. |
| 2009/0050661 A1 | 2/2009 | Na et al. |
| 2009/0060437 A1 | 3/2009 | Fini et al. |
| 2009/0091731 A1 | 4/2009 | Ossmann et al. |
| 2009/0104721 A1 | 4/2009 | Hirakata et al. |
| 2009/0157341 A1 | 6/2009 | Cheung |
| 2009/0170286 A1 | 7/2009 | Tsukamoto et al. |
| 2009/0176034 A1 | 7/2009 | Ruuttu et al. |
| 2009/0183764 A1 | 7/2009 | Meyer |
| 2009/0184849 A1 | 7/2009 | Nasiri et al. |
| 2009/0188543 A1 | 7/2009 | Bann |
| 2009/0199694 A1 | 8/2009 | Uh et al. |
| 2009/0212033 A1 | 8/2009 | Beck et al. |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0323160 A1 | 12/2009 | Egerton et al. |
| 2009/0323162 A1 | 12/2009 | Fanton et al. |
| 2009/0324899 A1 | 12/2009 | Feinstein et al. |
| 2009/0324903 A1 | 12/2009 | Rumsby |
| 2010/0020304 A1 | 1/2010 | Soer et al. |
| 2010/0024865 A1 | 2/2010 | Shah et al. |
| 2010/0025387 A1 | 2/2010 | Arai et al. |
| 2010/0027951 A1 | 2/2010 | Bookbinder et al. |
| 2010/0029460 A1 | 2/2010 | Shojiya et al. |
| 2010/0032087 A1 | 2/2010 | Takahashi et al. |
| 2010/0038349 A1 | 2/2010 | Ke et al. |
| 2010/0046761 A1 | 2/2010 | Henn et al. |
| 2010/0086741 A1 | 4/2010 | Bovatsek et al. |
| 2010/0089631 A1 | 4/2010 | Sakaguchi et al. |
| 2010/0089682 A1 | 4/2010 | Martini et al. |
| 2010/0089882 A1 | 4/2010 | Tamura |
| 2010/0102042 A1 | 4/2010 | Garner et al. |
| 2010/0129603 A1 | 5/2010 | Buck et al. |
| 2010/0145620 A1 | 6/2010 | Georgi et al. |
| 2010/0147813 A1 | 6/2010 | Lei et al. |
| 2010/0197116 A1 | 8/2010 | Shah |
| 2010/0206008 A1 | 8/2010 | Harvey et al. |
| 2010/0252538 A1 | 10/2010 | Zeygerman |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1 | 11/2010 | Dejneka et al. |
| 2010/0320179 A1 | 12/2010 | Morita et al. |
| 2010/0326138 A1 | 12/2010 | Kumatani et al. |
| 2010/0332087 A1 | 12/2010 | Claffee et al. |
| 2011/0017716 A1 | 1/2011 | Rumsby |
| 2011/0023298 A1 | 2/2011 | Chujo et al. |
| 2011/0037149 A1 | 2/2011 | Fukuyo et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0094267 A1 | 4/2011 | Aniolek et al. |
| 2011/0100401 A1 | 5/2011 | Fiorentini |
| 2011/0111179 A1 | 5/2011 | Blick et al. |
| 2011/0127697 A1 | 6/2011 | Milne |
| 2011/0132581 A1 | 6/2011 | Moss |
| 2011/0132881 A1 | 6/2011 | Liu |
| 2011/0136303 A1 | 6/2011 | Lee |
| 2011/0139760 A1 | 6/2011 | Shah et al. |
| 2011/0143470 A1 | 6/2011 | Lee |
| 2011/0177325 A1 | 7/2011 | Tomamoto et al. |
| 2011/0183116 A1 | 7/2011 | Hung et al. |
| 2011/0191024 A1 | 8/2011 | DeLuca |
| 2011/0210105 A1 | 9/2011 | Romashko et al. |
| 2011/0238308 A1 | 9/2011 | Miller et al. |
| 2011/0240476 A1 | 10/2011 | Wang et al. |
| 2011/0240611 A1 | 10/2011 | Sandstrom et al. |
| 2011/0240617 A1 | 10/2011 | Cheon et al. |
| 2011/0261429 A1 | 10/2011 | Sbar et al. |
| 2011/0277507 A1 | 11/2011 | Lu et al. |
| 2011/0300691 A1 | 12/2011 | Sakamoto et al. |
| 2011/0318555 A1 | 12/2011 | Bookbinder et al. |
| 2012/0017642 A1 | 1/2012 | Teranishi et al. |
| 2012/0026573 A1 | 2/2012 | Collins et al. |
| 2012/0047951 A1 | 3/2012 | Dannoux et al. |
| 2012/0047956 A1 | 3/2012 | Li |
| 2012/0047957 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0106117 A1 | 5/2012 | Sundaram et al. |
| 2012/0111310 A1 | 5/2012 | Ryu et al. |
| 2012/0125588 A1 | 5/2012 | Nam et al. |
| 2012/0131961 A1 | 5/2012 | Dannoux et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0147449 A1 | 6/2012 | Bhatnagar et al. |
| 2012/0196071 A1 | 8/2012 | Cornejo et al. |
| 2012/0196454 A1 | 8/2012 | Shah et al. |
| 2012/0205356 A1 | 8/2012 | Pluss |
| 2012/0211923 A1 | 8/2012 | Garner et al. |
| 2012/0214004 A1 | 8/2012 | Hashimoto et al. |
| 2012/0216570 A1 | 8/2012 | Abramov et al. |
| 2012/0229787 A1 | 9/2012 | Van et al. |
| 2012/0234049 A1 | 9/2012 | Bolton |
| 2012/0234807 A1 | 9/2012 | Sercel et al. |
| 2012/0237731 A1 | 9/2012 | Boegli et al. |
| 2012/0255935 A1 | 10/2012 | Kakui et al. |
| 2012/0262689 A1 | 10/2012 | Van et al. |
| 2012/0293784 A1 | 11/2012 | Xalter et al. |
| 2012/0297568 A1 | 11/2012 | Spezzani |
| 2012/0299219 A1 | 11/2012 | Shimoi et al. |
| 2012/0302139 A1 | 11/2012 | Darcangelo et al. |
| 2012/0320458 A1 | 12/2012 | Knutson |
| 2012/0324950 A1 | 12/2012 | Dale et al. |
| 2013/0019637 A1 | 1/2013 | Sol et al. |
| 2013/0031879 A1 | 2/2013 | Yoshikane et al. |
| 2013/0034688 A1 | 2/2013 | Koike et al. |

(56) References Cited

U.S. PATENT DOCUMENTS

| | | |
|---|---|---|
| 2013/0044371 A1 | 2/2013 | Rupp et al. |
| 2013/0047671 A1 | 2/2013 | Kohli |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0071079 A1 | 3/2013 | Peckham et al. |
| 2013/0071080 A1 | 3/2013 | Peckham et al. |
| 2013/0071081 A1 | 3/2013 | Peckham et al. |
| 2013/0075480 A1 | 3/2013 | Yokogi et al. |
| 2013/0078891 A1 | 3/2013 | Lee et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0126751 A1 | 5/2013 | Mizoguchi et al. |
| 2013/0129947 A1 | 5/2013 | Harvey et al. |
| 2013/0133367 A1 | 5/2013 | Abramov et al. |
| 2013/0136408 A1 | 5/2013 | Bookbinder et al. |
| 2013/0216573 A1 | 5/2013 | Hosseini et al. |
| 2013/0139708 A1 | 6/2013 | Hotta |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0171425 A1 | 7/2013 | Wang et al. |
| 2013/0174607 A1 | 7/2013 | Wootton et al. |
| 2013/0174610 A1 | 7/2013 | Teranishi et al. |
| 2013/0177033 A1* | 7/2013 | Muro .............. H01S 5/06 372/20 |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0210245 A1 | 8/2013 | Jackl |
| 2013/0220982 A1 | 8/2013 | Thomas et al. |
| 2013/0221053 A1 | 8/2013 | Zhang |
| 2013/0222877 A1 | 8/2013 | Greer et al. |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0248504 A1 | 9/2013 | Kusuda |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2013/0344684 A1 | 12/2013 | Bowden |
| 2014/0023087 A1 | 1/2014 | Czompo |
| 2014/0027951 A1 | 1/2014 | Srinivas et al. |
| 2014/0034730 A1 | 2/2014 | Lee |
| 2014/0036338 A1 | 2/2014 | Bareman et al. |
| 2014/0042202 A1 | 2/2014 | Lee |
| 2014/0047957 A1 | 2/2014 | Wu |
| 2014/0076869 A1 | 3/2014 | Lee et al. |
| 2014/0083986 A1* | 3/2014 | Zhang ............ B23K 26/40 219/121.69 |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141192 A1 | 5/2014 | Fernando et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0182125 A1 | 7/2014 | Rozbicki et al. |
| 2014/0199519 A1 | 7/2014 | Schillinger et al. |
| 2014/0216108 A1 | 8/2014 | Wiegel et al. |
| 2014/0238962 A1 | 8/2014 | Nawrodt et al. |
| 2014/0239034 A1 | 8/2014 | Cleary et al. |
| 2014/0239552 A1 | 8/2014 | Srinivas et al. |
| 2014/0290310 A1 | 10/2014 | Green |
| 2014/0291122 A1 | 10/2014 | Bando |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1 | 11/2014 | Bergh et al. |
| 2014/0352400 A1 | 12/2014 | Barrilado et al. |
| 2014/0361463 A1 | 12/2014 | Desimone et al. |
| 2015/0014891 A1 | 1/2015 | Amatucci et al. |
| 2015/0034612 A1 | 2/2015 | Hosseini et al. |
| 2015/0038313 A1 | 2/2015 | Hosseini |
| 2015/0044445 A1 | 2/2015 | Garner et al. |
| 2015/0059986 A1 | 3/2015 | Komatsu et al. |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0121960 A1 | 5/2015 | Hosseini |
| 2015/0122656 A1 | 5/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165396 A1 | 6/2015 | Mattson et al. |
| 2015/0165548 A1 | 6/2015 | Marjanovic et al. |
| 2015/0165560 A1 | 6/2015 | Hackert et al. |
| 2015/0165561 A1 | 6/2015 | Le et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1* | 6/2015 | Marjanovic ........ B23K 26/0613 428/131 |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0209922 A1 | 7/2015 | Yoshikawa |
| 2015/0232369 A1 | 8/2015 | Marjanovic et al. |
| 2015/0299018 A1 | 10/2015 | Bhuyan et al. |
| 2015/0311058 A1 | 10/2015 | Antsiferov et al. |
| 2015/0350991 A1 | 12/2015 | Sayadi et al. |
| 2015/0352671 A1 | 12/2015 | Darzi |
| 2015/0360991 A1 | 12/2015 | Grundmueller et al. |
| 2015/0362817 A1 | 12/2015 | Patterson et al. |
| 2015/0362818 A1 | 12/2015 | Greer |
| 2015/0367442 A1 | 12/2015 | Bovatsek et al. |
| 2016/0008927 A1 | 1/2016 | Grundmueller et al. |
| 2016/0009066 A1 | 1/2016 | Neiber et al. |
| 2016/0009585 A1 | 1/2016 | Bookbinder et al. |
| 2016/0016257 A1 | 1/2016 | Hosseini |
| 2016/0023922 A1 | 1/2016 | Addiego et al. |
| 2016/0031737 A1 | 2/2016 | Hoppe et al. |
| 2016/0031745 A1 | 2/2016 | Ortner et al. |
| 2016/0039044 A1 | 2/2016 | Kawaguchi |
| 2016/0059359 A1 | 3/2016 | Krueger et al. |
| 2016/0060156 A1 | 3/2016 | Krueger et al. |
| 2016/0097960 A1 | 4/2016 | Dixit et al. |
| 2016/0138328 A1 | 5/2016 | Behmke et al. |
| 2016/0152516 A1 | 6/2016 | Bazemore et al. |
| 2016/0154284 A1 | 6/2016 | Sano |
| 2016/0159679 A1 | 6/2016 | West |
| 2016/0168396 A1 | 6/2016 | Letocart et al. |
| 2016/0279895 A1 | 9/2016 | Marjanovic et al. |
| 2016/0280580 A1 | 9/2016 | Bohme |
| 2016/0282521 A1* | 9/2016 | Uchiyama ............ F21V 3/10 |
| 2016/0290791 A1 | 10/2016 | Buono et al. |
| 2016/0311717 A1 | 10/2016 | Nieber et al. |
| 2016/0368100 A1 | 12/2016 | Marjanovic et al. |
| 2017/0002601 A1 | 1/2017 | Bergh et al. |
| 2017/0008791 A1 | 1/2017 | Kim et al. |
| 2017/0052381 A1 | 2/2017 | Huang et al. |
| 2017/0169847 A1 | 6/2017 | Tamaki |
| 2017/0183168 A1 | 6/2017 | Jia |
| 2017/0197868 A1 | 7/2017 | Gupta et al. |
| 2017/0225996 A1 | 8/2017 | Bookbinder et al. |

(56) References Cited

U.S. PATENT DOCUMENTS

| | | |
|---|---|---|
| 2017/0252859 A1 | 9/2017 | Kumkar et al. |
| 2017/0355634 A1 | 12/2017 | Thierry |
| 2017/0368638 A1 | 12/2017 | Tayebati et al. |
| 2018/0029919 A1 | 2/2018 | Schnitzler et al. |
| 2018/0029920 A1 | 2/2018 | Marjanovic et al. |
| 2018/0062342 A1 | 3/2018 | Comstock et al. |
| 2018/0118602 A1 | 5/2018 | Hackert et al. |
| 2018/0133837 A1 | 5/2018 | Greenberg et al. |
| 2018/0134606 A1 | 5/2018 | Wagner et al. |
| 2018/0186677 A1 | 7/2018 | Ito et al. |
| 2018/0186678 A1 | 7/2018 | Boeker et al. |
| 2018/0297887 A1 | 10/2018 | Spier et al. |

FOREIGN PATENT DOCUMENTS

| | | |
|---|---|---|
| CN | 1473087 A | 2/2004 |
| CN | 1517313 A | 8/2004 |
| CN | 1573364 A | 2/2005 |
| CN | 1619778 A | 5/2005 |
| CN | 1735568 A | 2/2006 |
| CN | 1283409 C | 11/2006 |
| CN | 1890074 A | 1/2007 |
| CN | 1920632 A | 2/2007 |
| CN | 1930097 A | 3/2007 |
| CN | 101031383 A | 9/2007 |
| CN | 101043936 A | 9/2007 |
| CN | 101048255 A | 10/2007 |
| CN | 101386466 A | 3/2009 |
| CN | 101502914 A | 8/2009 |
| CN | 101595554 A | 12/2009 |
| CN | 101610870 A | 12/2009 |
| CN | 201357287 Y | 12/2009 |
| CN | 101622722 A | 1/2010 |
| CN | 101637849 A | 2/2010 |
| CN | 201471092 U | 5/2010 |
| CN | 101862907 A | 10/2010 |
| CN | 101965242 A | 2/2011 |
| CN | 101980982 A | 2/2011 |
| CN | 102046545 A | 5/2011 |
| CN | 102060437 A | 5/2011 |
| CN | 102105256 A | 6/2011 |
| CN | 102248302 A | 11/2011 |
| CN | 102272355 A | 12/2011 |
| CN | 102326232 A | 1/2012 |
| CN | 102343631 A | 2/2012 |
| CN | 102356049 A | 2/2012 |
| CN | 102356050 A | 2/2012 |
| CN | 102574246 A | 7/2012 |
| CN | 102596830 A | 7/2012 |
| CN | 102642092 A | 8/2012 |
| CN | 102649199 A | 8/2012 |
| CN | 102672355 A | 9/2012 |
| CN | 102674709 A | 9/2012 |
| CN | 102741012 A | 10/2012 |
| CN | 102898014 A | 1/2013 |
| CN | 102916081 A | 2/2013 |
| CN | 102923939 A | 2/2013 |
| CN | 102962583 A | 3/2013 |
| CN | 103013374 A | 4/2013 |
| CN | 103079747 A | 5/2013 |
| CN | 103143841 A | 6/2013 |
| CN | 103159401 A | 6/2013 |
| CN | 203021443 U | 6/2013 |
| CN | 103237771 A | 8/2013 |
| CN | 103273195 A | 9/2013 |
| CN | 103316990 A | 9/2013 |
| CN | 103329035 A | 9/2013 |
| CN | 103339559 A | 10/2013 |
| CN | 103359947 A | 10/2013 |
| CN | 103359948 A | 10/2013 |
| CN | 103531414 A | 1/2014 |
| CN | 103746027 A | 2/2014 |
| CN | 203509350 U | 4/2014 |
| CN | 103817434 A | 5/2014 |
| CN | 103831539 A | 6/2014 |
| CN | 104108870 A | 10/2014 |
| CN | 104344202 A | 2/2015 |
| CN | 204211638 U | 3/2015 |
| CN | 105081564 A | 11/2015 |
| CN | 105164581 A | 12/2015 |
| CN | 105209218 A | 12/2015 |
| CN | 105246850 A | 1/2016 |
| CN | 103224117 B | 2/2016 |
| CN | 105392593 A | 3/2016 |
| CN | 105517969 A | 4/2016 |
| CN | 205328860 U | 6/2016 |
| CN | 106007349 A | 10/2016 |
| DE | 1020448 B | 12/1957 |
| DE | 2231330 A1 | 1/1974 |
| DE | 10322376 A1 | 12/2004 |
| DE | 102006042280 A1 | 6/2007 |
| DE | 10200635555 A1 | 1/2008 |
| DE | 102011000768 A1 | 8/2012 |
| DE | 102012010635 A1 | 11/2013 |
| DE | 102012110971 A1 | 5/2014 |
| DE | 102013103370 A1 | 10/2014 |
| DE | 102013223637 A1 | 5/2015 |
| DE | 102014213775 A1 | 1/2016 |
| DE | 102014116958 A1 | 5/2016 |
| DE | 102016102768 A1 | 8/2017 |
| EA | 004167 B1 | 2/2004 |
| EP | 0270897 A1 | 6/1988 |
| EP | 0609978 A1 | 8/1994 |
| EP | 0656241 A1 | 6/1995 |
| EP | 0938946 A1 | 9/1999 |
| EP | 0949541 A2 | 10/1999 |
| EP | 1043110 A2 | 10/2000 |
| EP | 1306196 A1 | 5/2003 |
| EP | 1159104 B1 | 8/2004 |
| EP | 1609559 A1 | 12/2005 |
| EP | 1990125 A1 | 11/2008 |
| EP | 2105239 A1 | 9/2009 |
| EP | 2133170 A1 | 12/2009 |
| EP | 2202545 A1 | 6/2010 |
| EP | 2258512 A1 | 12/2010 |
| EP | 2398746 A1 | 12/2011 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| EP | 3311947 A1 | 4/2018 |
| FR | 298294 A1 | 10/2013 |
| GB | 0768515 A | 2/1957 |
| GB | 1242172 | 8/1971 |
| GB | 2481190 A | 12/2011 |
| JP | 53-018756 A | 2/1978 |
| JP | 61-027212 A | 2/1986 |
| JP | 61-074794 A | 4/1986 |
| JP | 62-046930 A | 2/1987 |
| JP | 63-192561 A | 8/1988 |
| JP | 64-077001 A | 3/1989 |
| JP | 01-179770 A | 7/1989 |
| JP | 1179770 A | 7/1989 |
| JP | 05-274085 A | 10/1993 |
| JP | 05-300544 A | 11/1993 |
| JP | 06-082720 A | 3/1994 |
| JP | 06-318756 A | 11/1994 |
| JP | 6318756 A | 11/1994 |
| JP | 08-184581 A | 7/1996 |
| JP | 09-109243 A | 4/1997 |
| JP | 09106243 A | 4/1997 |
| JP | 11-197498 A | 7/1999 |
| JP | 11269683 A | 10/1999 |
| JP | 11-330597 A | 11/1999 |
| JP | 11-347861 A | 12/1999 |
| JP | 11347758 A | 12/1999 |
| JP | 2000225485 A | 8/2000 |
| JP | 2000-327349 A | 11/2000 |
| JP | 2001-130921 A | 5/2001 |
| JP | 2001138083 A | 5/2001 |
| JP | 2001-179473 A | 7/2001 |
| JP | 2002-045985 A | 2/2002 |
| JP | 2002-205181 A | 7/2002 |

(56) References Cited

FOREIGN PATENT DOCUMENTS

| | | |
|---|---|---|
| JP | 2002-210730 A | 7/2002 |
| JP | 2002228818 A | 8/2002 |
| JP | 2002-321081 A | 11/2002 |
| JP | 2003-025085 A | 1/2003 |
| JP | 2003-088985 A | 3/2003 |
| JP | 2003062756 A | 3/2003 |
| JP | 2003114400 A | 4/2003 |
| JP | 2003154517 A | 5/2003 |
| JP | 2003-181668 A | 7/2003 |
| JP | 2003238178 A | 8/2003 |
| JP | 3445250 B2 | 9/2003 |
| JP | 2003-340579 A | 12/2003 |
| JP | 2004-182530 A | 7/2004 |
| JP | 2004209675 A | 7/2004 |
| JP | 2004-348137 A | 12/2004 |
| JP | 2005-000952 A | 1/2005 |
| JP | 2005104819 A | 4/2005 |
| JP | 2005-135964 A | 5/2005 |
| JP | 2005-144487 A | 6/2005 |
| JP | 2005-179154 A | 7/2005 |
| JP | 2005-219960 A | 8/2005 |
| JP | 2005205440 A | 8/2005 |
| JP | 2005-263623 A | 9/2005 |
| JP | 2005288503 A | 10/2005 |
| JP | 2006-108478 A | 4/2006 |
| JP | 3775250 B2 | 5/2006 |
| JP | 3775410 B2 | 5/2006 |
| JP | 2006130691 A | 5/2006 |
| JP | 2006-150385 A | 6/2006 |
| JP | 2006-182009 A | 7/2006 |
| JP | 2006-240948 A | 9/2006 |
| JP | 3823108 B2 | 9/2006 |
| JP | 2006248885 A | 9/2006 |
| JP | 2006-327711 A | 12/2006 |
| JP | 2007021548 A | 2/2007 |
| JP | 2007-196277 A | 8/2007 |
| JP | 2007253203 A | 10/2007 |
| JP | 2008-018547 A | 1/2008 |
| JP | 2008-132616 A | 6/2008 |
| JP | 2008-168327 A | 7/2008 |
| JP | 2008-522950 A | 7/2008 |
| JP | 2008-266046 A | 11/2008 |
| JP | 2008-288577 A | 11/2008 |
| JP | 2009056482 A | 3/2009 |
| JP | 2009-082958 A | 4/2009 |
| JP | 2009-084089 A | 4/2009 |
| JP | 2009-126779 A | 6/2009 |
| JP | 2009-142886 A | 7/2009 |
| JP | 2009-178725 A | 8/2009 |
| JP | 2009172633 A | 8/2009 |
| JP | 2009-255114 A | 11/2009 |
| JP | 2009-269057 A | 11/2009 |
| JP | 2010017990 A | 1/2010 |
| JP | 2010-042424 A | 2/2010 |
| JP | 4418282 B2 | 2/2010 |
| JP | 2010046761 A | 3/2010 |
| JP | 04592855 B2 | 12/2010 |
| JP | 2011-011212 A | 1/2011 |
| JP | 2011-037707 A | 2/2011 |
| JP | 2011049398 A | 3/2011 |
| JP | 2011-512259 A | 4/2011 |
| JP | 04672689 B2 | 4/2011 |
| JP | 2011-517299 A | 6/2011 |
| JP | 2011-517622 A | 6/2011 |
| JP | 2011-138083 A | 7/2011 |
| JP | 2011-520748 | 7/2011 |
| JP | 2011-147943 A | 8/2011 |
| JP | 2011-240291 A | 12/2011 |
| JP | 04880820 B2 | 2/2012 |
| JP | 2012024782 A | 2/2012 |
| JP | 2012031018 A | 2/2012 |
| JP | 2012-517957 A | 8/2012 |
| JP | 2012159749 A | 8/2012 |
| JP | 2012187618 A | 10/2012 |
| JP | 2012-232894 A | 11/2012 |
| JP | 2012-528772 A | 11/2012 |
| JP | 2013007842 A | 1/2013 |
| JP | 2013031879 A | 2/2013 |
| JP | 2013043808 A | 3/2013 |
| JP | 2013-063863 A | 4/2013 |
| JP | 2013075802 A | 4/2013 |
| JP | 2013091578 A | 5/2013 |
| JP | 2013-121908 A | 6/2013 |
| JP | 2013-136075 A | 7/2013 |
| JP | 2013-144613 A | 7/2013 |
| JP | 2013-528492 A | 7/2013 |
| JP | 2013132664 A * | 7/2013 ......... B23K 26/0624 |
| JP | 2013-150990 A | 8/2013 |
| JP | 2013-168445 A | 8/2013 |
| JP | 05274085 B2 | 8/2013 |
| JP | 2013-536081 A | 9/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| JP | 2013-245153 A | 12/2013 |
| JP | 2014-001102 A | 1/2014 |
| JP | 2014-037006 A | 2/2014 |
| JP | 2014-117707 A | 6/2014 |
| JP | 2014104484 A | 6/2014 |
| JP | 2014-156289 A | 8/2014 |
| JP | 2015-030040 A | 2/2015 |
| JP | 2015-091606 A | 5/2015 |
| JP | 2015-129076 A | 7/2015 |
| JP | 2015-519722 A | 7/2015 |
| JP | 2015-536896 A | 12/2015 |
| JP | 2015-543336 | 2/2016 |
| JP | 2016-021077 A | 2/2016 |
| JP | 6061193 B2 | 1/2017 |
| KR | 10-2002-0031573 A | 5/2002 |
| KR | 2009057161 A | 6/2009 |
| KR | 10-2009-0107417 A | 10/2009 |
| KR | 2010-0120297 A | 11/2010 |
| KR | 1020621 B1 | 3/2011 |
| KR | 10-2011-0120862 A | 11/2011 |
| KR | 2011-0121637 A | 11/2011 |
| KR | 10-2012-0000073 A | 1/2012 |
| KR | 2012015366 A | 2/2012 |
| KR | 10-1120471 B1 | 3/2012 |
| KR | 2012074508 A | 7/2012 |
| KR | 2012-0102675 A | 9/2012 |
| KR | 2013-0031377 A | 3/2013 |
| KR | 2013031380 A | 3/2013 |
| KR | 10-1259349 B1 | 4/2013 |
| KR | 1269474 B1 | 5/2013 |
| KR | 10-2013-0075651 A | 7/2013 |
| KR | 2013-0079395 A | 7/2013 |
| KR | 10-2013-0111269 A | 10/2013 |
| KR | 2013124646 A | 11/2013 |
| KR | 10-2013-0135873 A | 12/2013 |
| KR | 1344368 B1 | 12/2013 |
| KR | 2014022980 A | 2/2014 |
| KR | 2014022981 A | 2/2014 |
| KR | 1020140064220 A | 5/2014 |
| KR | 10-2014-0112652 A | 9/2014 |
| KR | 10-2015-0009153 A | 1/2015 |
| KR | 2015-0016176 A | 2/2015 |
| NL | 2017998 | 6/2018 |
| TW | 480550 | 3/2002 |
| TW | 201041027 A | 11/2010 |
| TW | 201139025 A | 11/2011 |
| TW | 1362370 B | 4/2012 |
| TW | 201226345 A | 7/2012 |
| TW | 201311592 A | 3/2013 |
| TW | 201331136 A | 8/2013 |
| TW | 201339111 A | 10/2013 |
| TW | 201436968 A | 10/2014 |
| TW | I468354 B | 1/2015 |
| TW | I520804 B | 2/2016 |
| TW | 201612615 A | 4/2016 |
| WO | 98/21154 A1 | 5/1998 |
| WO | 1999029243 A1 | 6/1999 |
| WO | 1999063900 A1 | 12/1999 |

(56) References Cited

FOREIGN PATENT DOCUMENTS

| WO | 00/51778 A1 | 9/2000 |
|---|---|---|
| WO | 02/39063 A1 | 5/2002 |
| WO | 2003/007370 A1 | 1/2003 |
| WO | 2004110693 A1 | 12/2004 |
| WO | 2006/017583 A2 | 2/2006 |
| WO | 2006073098 A1 | 7/2006 |
| WO | 2007094160 A1 | 8/2007 |
| WO | 2007/119740 A1 | 10/2007 |
| WO | 2008/012186 A1 | 1/2008 |
| WO | 2008049389 A1 | 5/2008 |
| WO | 2008080182 A1 | 7/2008 |
| WO | 2008/102848 A1 | 8/2008 |
| WO | 2008/108332 A1 | 9/2008 |
| WO | 2008/126742 A1 | 10/2008 |
| WO | 2008128612 A1 | 10/2008 |
| WO | 2009/012913 A1 | 1/2009 |
| WO | 2009/114372 A2 | 9/2009 |
| WO | 2009114375 A2 | 9/2009 |
| WO | 2009/119694 A1 | 10/2009 |
| WO | 2010035736 A1 | 4/2010 |
| WO | 2010/096359 A1 | 8/2010 |
| WO | 2010/111609 A2 | 9/2010 |
| WO | 2010/129459 A2 | 11/2010 |
| WO | 2011/025908 A1 | 3/2011 |
| WO | 2011056781 A1 | 5/2011 |
| WO | 2012006736 A2 | 1/2012 |
| WO | 2012/075072 A2 | 6/2012 |
| WO | 2012108052 A1 | 8/2012 |
| WO | 2013/016157 A1 | 1/2013 |
| WO | 2013022148 A1 | 2/2013 |
| WO | 2013043173 A1 | 3/2013 |
| WO | 2013/084877 A1 | 6/2013 |
| WO | 2013/084879 A1 | 6/2013 |
| WO | 2013138802 A1 | 9/2013 |
| WO | 2013150990 A1 | 10/2013 |
| WO | 2013153195 A1 | 10/2013 |
| WO | 2014/010490 A1 | 1/2014 |
| WO | 2014/012125 A1 | 1/2014 |
| WO | 2014/028022 A1 | 2/2014 |
| WO | 2014/058663 A1 | 4/2014 |
| WO | 2014/075995 A2 | 5/2014 |
| WO | 2014064492 A1 | 5/2014 |
| WO | 2014079478 A1 | 5/2014 |
| WO | 2014079570 A1 | 5/2014 |
| WO | 2014/085663 A1 | 6/2014 |
| WO | 2014/111385 A1 | 7/2014 |
| WO | 2014/111794 A1 | 7/2014 |
| WO | 2014/121261 A1 | 8/2014 |
| WO | 2014/161534 A2 | 10/2014 |
| WO | 2014/161535 A2 | 10/2014 |
| WO | 2015/077113 A1 | 5/2015 |
| WO | 2015/094898 A2 | 6/2015 |
| WO | 2015/095088 A1 | 6/2015 |
| WO | 2015/095090 A1 | 6/2015 |
| WO | 2015/095146 A1 | 6/2015 |
| WO | 2015/095151 A2 | 6/2015 |
| WO | 2015/114032 A1 | 8/2015 |
| WO | 2015/128833 A1 | 9/2015 |
| WO | 2015/132008 A1 | 9/2015 |
| WO | 2015127583 A1 | 9/2015 |
| WO | 2016005455 A1 | 1/2016 |
| WO | 2016010954 A2 | 1/2016 |
| WO | 2016/079275 A1 | 5/2016 |
| WO | 2016/089799 A1 | 6/2016 |
| WO | 2016/100954 A1 | 6/2016 |
| WO | 2016154284 A1 | 9/2016 |
| WO | 2017/009149 A1 | 1/2017 |
| WO | 2017/091529 A1 | 6/2017 |
| WO | 2017/093393 A1 | 6/2017 |

OTHER PUBLICATIONS

English Translation of JP2017501187 Office Action dated May 15, 2019; 5 Pages; Japanse Patent Office.

http://www.gtat.com/Collateral/Documents/English-US/Sapphire/12-21-12_GT_TouchScreen_V3_web.pdf.

"What is the difference between Ra and RMS?"; Harrison Electropolishing LP; (http://www.harrisonep.com/electropolishingra.html), Accessed Aug. 8, 2016.

Kerr. "Filamentary tracks formed in transparent optical glass by laser beam self-focusing. II. Theoretical Analysis" Physical Review A. 4(3) 1971, pp. 1196-1218.

Tymon Barwicz, et al., "Assembly of Mechanically Compliant Interfaces between Optical Fibers and Nanophotonic Chips", Tymon Barwicz (IBM), et al., Electronic Components & Technology Conference, 2014,. 978-1799-2407-3, 2014 IEEE, pp. 179-185.

Amended claims 1 , 2 Amended Claims (Nov. 21, 2018) GMvp4 p. 1.

Case Design Guidelines for Apple Devices; Sep. 13, 2013; pp. 1-58; Apple Inc.

Claim 1—published on Nov. 20, 2019 EP947: Anspruch 1—erteilt am 20. Nov. 2019 GMvp5 p. 1.

Corning Eagle AMLCD Glass Substrates Material Information; Apr. 2005; pp. MIE 201-1-MIE 201-3; Corning Incorporated.

D6 Amended claim 1 EP947: Anspruch 1—geandert am 21. Nov. 2018 GMvp3 p. 1.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

European Patent Application No. 15745621.1 Office Action dated Nov. 21, 2017; 2 Pages; European Patent Office.

Faccio et al. "Kerr-induced spontaneous Bessel beam formation in the regime of strong two-photon absorption" Optics Express 16(11) 2008, pp. 8213-8218.

Gollier et al., U.S. Appl. No. 62/024,122, "Systems and Methods for Processing Transparent Materials Using Adjustable Laser Beam Focal Lines", filed Jul. 14, 2014., U.S. Appl. No. 62/024,122.

GT ASF Grown Sapphire Cover and Touch Screen Material; www.gtat.com, 2012; pp. 1-2; GTAT Corporation.

International Search Report and Written Opinion of the International Searching Authority; PCT/US2015/039468; dated Oct. 19, 2015; 9 Pages; European Patent Office.

Perry, M. et al.; Ultrashort-Pulse Laser Machining; International Congress on Applications of Lasers and Electro-Optics; Orlando, Florida; Nov. 16-19, 1998; pp. 1-24.

Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).

Product Data Sheet for Corning Eagle XG Slim Glass, Issued Aug. 2013; 2 Pages.

Product data sheet for Corning Eagle XR glass substrate, issued Jan. 2006 (Year: 2006).

Ra & RMS: Calculating Surface Roughness; Harrison Eelectropolishing; 2012.

Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).

Sukumaran, "Through-Package-Via Formation and Metallization of Glass Interposers.", Electronic Components and Technology Conference: 557-563, (2010).

Unichains, Engineering Manual: Innovative Belt & Chain solutions for every industry and application, available publically at least as of Jun. 1, 2016 as evidenced at the following hyperlink: https://web.archive.org/web/20160601OOOOOO/http://www.unichains.com/.

Tsai et al. ,"Internal modification for cutting transparent glass using femtosecond Bessel beams", Optical Engineering, Soc. of Photo-optical Instrumentation Engineering, Bellingham, vol. 53, May 2014, p. 51503.

Korean Patent Application No. 10-2017-7003404, Office Action, dated Nov. 9, 2021, 16 pages (9 pages of English Translation and 7 pages of Original Document), Korean Patent Office.

McGloin et al."Bessel beams: diffraction in a new light" Contemporary Physics, vol. 46 No. 1 (2005) pp. 15-28.

(56) References Cited

OTHER PUBLICATIONS

Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometricoptics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920, Jul. 1939.
Toytman et al. "Optical breakdown in transparent media with adjustable axial length and location", Optics Express vol. 18 No 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. Of SPIE vol. 8967 896711-1 (2014).
Wang et al., "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi: 10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. Of SPIE vol. 7728 77281V-1, Apr. 2010.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.

(56) References Cited

OTHER PUBLICATIONS

Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654, Apr. 1987.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnei axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47, 1997.
Lapczyna et al., "Ultra high repetition rate (133 MHz) laser ablation of aluminum with 1.2-ps pulses"; Applied Physic A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).

* cited by examiner

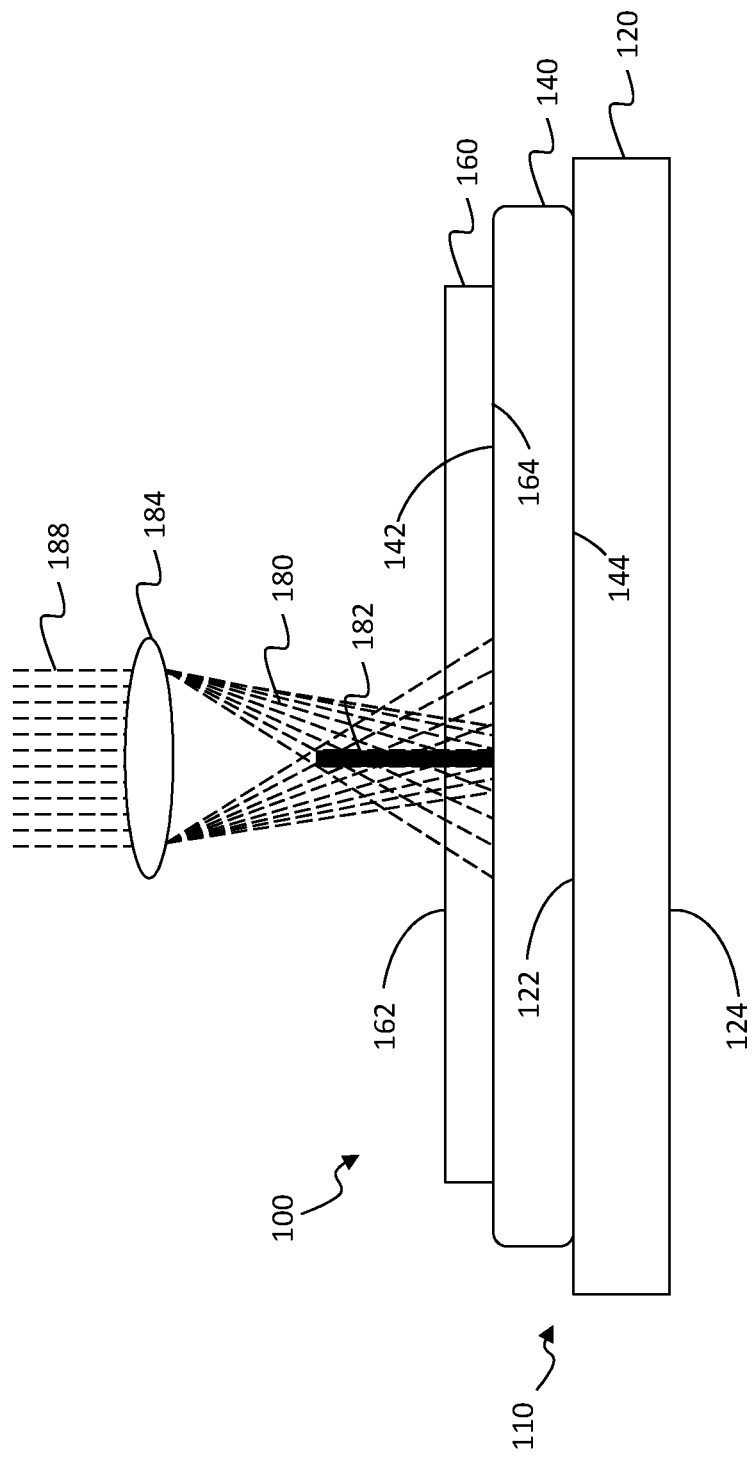

METHODS AND APPARATUSES FOR LASER PROCESSING MATERIALS

RELATED APPLICATIONS

This is a divisional application of U.S. application Ser. No. 14/974,181 filed on Jul. 8, 2015 which claims the benefit of priority to U.S. Provisional Application No. 62/021917, filed on Jul. 8, 2014. The entire teachings of the above applications are incorporated herein by reference.

TECHNICAL FIELD

The present specification relates generally to the manufacture of materials and, more specifically, to laser processing of materials.

BACKGROUND

In recent years, customer demand to reduce the size, weight, and material cost of devices has led to considerable technological growth in flat panel displays for touch screens, tablets, smartphones, and TVs. Industrial lasers are becoming important tools for applications requiring high precision cutting of these materials. However, laser processing can be difficult because the high intensity laser may damage the components utilized in laser processing of the materials.

Accordingly, a need exists for alternative methods and apparatuses for laser processing materials.

SUMMARY

The embodiments described herein relate to methods and apparatuses for laser processing materials. According to one embodiment, transparent material may be laser processed. The method may comprise positioning the transparent material on a carrier and transmitting a laser beam through the transparent material, where the laser beam may be incident on a side of the transparent material opposite the carrier. The transparent material may be substantially transparent to the laser beam and the carrier may comprise a support base and a laser disruption element. The laser disruption element may disrupt the laser beam transmitted through the transparent material such that the laser beam may not have sufficient intensity below the laser disruption element to damage the support base.

In another embodiment, a multilayer stack for laser processing may comprise a carrier comprising a support base and a laser disruption element, and a transparent material positioned on the carrier. The laser disruption element may be positioned on top of the support base. The transparent material may comprise a substantially flat top surface and a substantially flat bottom surface, wherein the transparent material may be substantially transparent to a laser beam incident on a surface of the transparent material opposite the carrier. The laser disruption element may optically disrupt the laser beam transmitted through the transparent material such that the laser beam may not have sufficient intensity below the laser disruption element to damage the support base.

In yet another embodiment, a carrier may be protected when a transparent material positioned on the carrier is laser processed. The method may comprise positioning the transparent material on top of the carrier, transmitting a laser beam through the transparent material, and positioning a laser disruption element between the support base and the transparent material. The carrier may comprise a support base. The laser beam may be incident on a surface of the transparent material opposite the carrier and the laser beam may comprise a focal area having an intensity sufficient to damage the carrier. The laser disruption element may optically disrupt the laser beam transmitted through the transparent material such that the laser beam may not have sufficient intensity at any point below the laser disruption element to damage the support base.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 schematically depicts a cross-sectional diagram of a multilayered stack undergoing laser processing, according to one or more embodiments shown and described herein.

DETAILED DESCRIPTION

Reference will now be made in detail to embodiments of apparatuses and methods for laser processing materials, examples of which are illustrated in the accompanying drawings. Whenever possible, the same reference numerals will be used throughout the drawings to refer to the same or like parts. One embodiment of a multilayered stack for laser processing is schematically depicted in FIG. 1. Generally, the laser processing may perforate a material that is transparent to the laser, sometimes referred to herein as the "transparent material," and the perforation may cause or contribute to cutting the transparent material at the perforation. The multilayered stack generally includes a transparent material which can be perforated or otherwise mechanically deformed by a laser beam incident on the top surface of the transparent material. The transparent material is positioned on a carrier, where at least a portion of the carrier is non-transparent to the laser beam. The carrier generally includes a support base and a laser disruption element positioned between the support base and the transparent material. The support base supports the transparent material and may be utilized to transport the transparent material to be laser processed. In one embodiment, the support base material may be non-transparent to the laser beam and may be damaged if contacted by a portion of a laser beam having an intensity great enough to damage the carrier, such as a focused area of a laser beam. However, the laser disruption element positioned between the transparent material and the support base may disrupt and diffuse a laser beam exiting the transparent material before it can contact the support base, such that upon optical disruption of the laser beam by the laser disruption element, the laser beam does not have sufficient intensity below the laser disruption element to damage the support base. As such, the laser disruption element may act as a shield to protect the support base from damage associated with contact with a portion of a laser beam with sufficient intensity to damage the support base. Various embodiments of methods and apparatuses for use in laser processing transparent materials will be described herein with specific references to the appended claims.

Referring to FIG. 1, a multilayer stack 100 is schematically depicted. Generally, the multilayer stack 100 comprises a transparent material 160 and a carrier 110 which comprises a laser disruption element 140 and a support base 120. In embodiments described herein, the transparent material 160 is positioned on top of the laser disruption element 140, which is positioned on top of the support base 120. As used herein, reference to a position above or on top of another position assumes that the top or uppermost position is the surface of the multilayer stack 100 upon which the laser beam 180 is first incident. For example, in FIG. 1, the surface of the transparent material 160 that is closest to the source laser 188 is the top surface 162 and placement of the laser disruption element 140 below the transparent material 160 means that the laser beam 180 traverses the transparent material 160 before interacting with the laser disruption element 140. As shown in FIG. 1, the source laser 188 in transmitted through an optical element 184 which forms a focused area of the laser beam 180, such as a focal line 182, which is incident upon the transparent material 160.

The transparent material 160 may be laser processed with a laser beam 180 which may alone, or with other manufacturing steps, be utilized to cut the transparent material 160. As used herein, laser processing refers to cutting, perforating, ablating, or otherwise altering the mechanical integrity of a material with a laser beam 180. Generally, the laser beam 180 must have a certain intensity at a particular area of the transparent material 160 to alter the mechanical integrity of the transparent material 160. As such, a defocused or disrupted laser beam may not have sufficient intensity to mechanically affect a material at a selected area while a focused laser beam may have sufficient intensity to cut, perforate, or ablate an area of a laser processed material. However, a focused area of a laser beam, such as a laser beam with a focused focal line 182, may have sufficient intensity to perforate the transparent material 160 as well as to damage a support base 120 directly contacted by the focal line 182. A focal line 182 of a laser beam 180 may be produced by an optical assembly 184 which can optically alter the path of a source laser 188. Also, as used herein, in the context of laser beams, "intensity" may be referred to as "energy density" and the two terms are interchangeable. The laser beam 180 has a wavelength, and as used herein, a material that is "transparent" is substantially transparent to electromagnetic radiation of the wavelength of the laser such that the absorption by the transparent material 160 is less than about 10%, less than about 5%, or even less than about 1% per mm of material depth at the wavelength of the laser. "Electromagnetic radiation" may be referred to herein as "light" and the two terms are interchangeable and may correspond with electromagnetic radiation both inside and outside of the visible spectrum.

The support base 120 is generally any structure capable of supporting the transparent material 160 which will be laser processed by the laser beam 180. The support base 120 may act as a carrying tray for the transparent material 160 and may have a substantially flat top surface 122, for interaction with a flat transparent material 160, and a substantially flat bottom surface 124, for interaction with a substantially flat work table upon which the support base 120 may be positioned. The support base 120 may be positioned on a table or other workspace for stability during laser processing. In one embodiment, the support base 120 may comprise aluminum. For example, the support base 120 may comprise greater than about 50%, greater than about 70%, greater than about 90%, greater than about 95%, or even greater than about 99% aluminum. In one embodiment, the support base 120 may comprise a honeycomb aluminum structure, such as ALUCORE®, commercially available from 3A Composites International AG. In another embodiment, the support base 120 may comprise polyoxymethylene. If non-transparent materials, such as the materials of the support base 120, are contacted by the focal line 182, the support base 120 can be damaged, which may result in contamination of the laser processed transparent material 160. As used herein, damage to the support base 120 includes, without limitation scratching, ablating, cutting, slashing, abrasion, scoring, or other disruption in the mechanical integrity of the top surface 122 of the support base 120.

In one embodiment, the support base 120 may be placed on a table or other work station during the laser processing. The table or workstation may have a vacuum system which creates suction upon the surface of the table or workstation. For example, the table or workstation may have vacuum holes in its surface, and the support base 120 and laser disruption element 140 may have corresponding holes through which the vacuum may create suction and secure materials positioned on top of the laser disruption element 140. For example, the transparent material 160 may be secured to the disruption element 140 by vacuum suction which permeates through holes in the disruption element 140, support base 120, and workstation. The support base 120 and the laser disruption element 140 may be mechanically fastened to one another such as with screws, fasteners, pins, or other suitable means. As such, the transparent material 160 can rest upon the laser disruption element 140 and be secured by the vacuum system while laser processed.

The transparent material 160 may be any material substantially transparent to the electromagnetic radiation of the laser beam 180. For example, the transparent material 160 may be, without limitation, glass, sapphire, silicon, silicon-arbide, quartz, alumina (AbO$_3$), aluminum nitride (AIN), Zirconia (ZrO$_2$), gallium-Nitride, gallium-arsenide (GaAs), gallium-phosphide (GaP), gallium-antimonide (GaSh), indium-arsenide (InAs), indium-phosphide (InP), indium-ntimonide (InSb), cadmium-sulphide (CdS), cadmium-selenide (CdSe), cadmium-telluride (CdTe), zinc-sulfide (ZnS), zink-selenide (ZnSe), zink-telluride (ZnTe), germanium (Ge), lithium-niobate (LiNbO$_3$), lithium-tantalate (LiTaO$_3$), or combinations thereof. The transparent material 160 may have a substantially flat top surface 162 and a substantially flat bottom surface 164, such as would be suitable for cover glass for an electronic device. The top surface 162 and/or the bottom surface 164 may be polished. In another embodiment, the transparent material 160 may be a wafer material for semiconductor manufacturing. If glass is utilized as the transparent material 160, the glass may generally be any glass suitable for formation as a sheet. In some embodiments, the glass may be ion-exchangeable aluminosilicate glass. Examples of such ion-exchangeable aluminosilicate glass include, but are not limited to, Gorilla Glass® and Gorilla Glass II® (commercially available from Corning, Inc.). Such glass, especially after laser processing, may be well suited for many uses, such as, for example, as cover glass for hand-held consumer electronic devices.

The laser beam 180 may be operable to create small (micron and smaller) "holes" in the transparent material 160 for the purpose of drilling, cutting, separating, perforating, or otherwise processing the transparent material 160 at the focal line 182. More particularly, an ultrashort (i.e., from $10^{-10}$ to $10^{-15}$ second) pulse laser beam 180 having wavelengths such as 1064 nm, 532 nm, 355 nm, or 266 nm is focused, as the focal line 182, to an energy density above the threshold needed to create a defect in the region of focus at the surface of or within the transparent material 160. The laser beam 180 may have a repetition rate in a range of between about 1 kHz and 2 MHz, or in another embodiment, between about 10 kHz and about 650 kHz. By repeating the process, a series of laser-induced defects aligned along a predetermined path can be created in the transparent material 160. By spacing the laser-induced features sufficiently close together, a controlled region of mechanical weakness within the transparent material 160 can be created and the transparent material 160 can be precisely fractured or separated (mechanically or thermally) along the path defined by the series of laser-induced defects (shown in FIG. 1 as the area of the transparent material 160 proximate the focal line 182). The ultrashort laser pulse(s) may be optionally followed by a carbon dioxide ($CO_2$) laser or other source of thermal stress to effect fully automated separation of the transparent material 160. Representative laser beam 180 characteristics, which can be applied to laser process a transparent substrate, are described in detail in U.S. Patent Application 61/917,092 TITLED "METHOD AND DEVICE FOR THE LASER-BASED MACHINING OF SHEET-LIKE SUBSTRATES, the teachings of which are incorporated herein by reference in their entirety.

The wavelength of the laser beam 180 may be selected so that the material to be laser processed (drilled, cut, ablated, damaged or otherwise appreciably modified by the laser) is transparent to the wavelength of the laser. The selection of the laser source may also depend on the ability to induce multi-photon absorption (MPA) in the transparent material 160. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two photons. MPA is a third-order nonlinear process that is several orders of magnitude weaker than linear absorption. It differs from linear absorption in that the strength of absorption depends on the square of the light intensity, thus making it a nonlinear optical process. At ordinary light intensities, MPA is negligible. If the light intensity (energy density) is extremely high, such as in the region of the focal line 182 of a laser beam 180 (particularly a pulsed laser source), MPA becomes appreciable and leads to measurable effects in the material within the region where the energy density of the laser beam 180 is sufficiently high (i.e. the focal line 182). Within the region of the focal line 182, the energy density may be sufficiently high to result in ionization.

At the atomic level, the ionization of individual atoms has discrete energy requirements. Several elements commonly used in glass (e.g., Si, Na, K) have relatively low ionization energies, such as about 5 eV. Without the phenomenon of MPA, a laser wavelength of about 248 nm would be required to create linear ionization at about 5 eV. With MPA, ionization or excitation between states separated in energy by about 5 eV can be accomplished with wavelengths longer than 248 nm. For example, photons with a wavelength of 532 nm have an energy of about 2.33 eV, so two photons with wavelengths of 532 nm can induce a transition between states separated in energy by about 4.66 eV in two-photon absorption (TPA).

Thus, atoms and bonds may be selectively excited or ionized in the regions of the transparent material 160 where the energy density of the laser beam 180 is sufficiently high to induce nonlinear TPA of a laser wavelength having half the required excitation energy. MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line or "perforation") that mechanically weakens the transparent material 160 and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the transparent material 160. In one embodiment, laser processing includes separation of a part from the transparent material 160 processed by the laser beam 180, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

According to some embodiments perforations can be accomplished with the use of an ultra-short pulse laser in combination with optics that generates a focal line to fully perforate the body of a range of glass compositions. In some embodiments, the pulses are single pulses (i.e., the laser provides equally separated single pulses rather than pulse bursts (closely spaced single pulses that are grouped together), with the pulse duration of the individual pulses is in a range of between greater than about 1 picoseconds and less than about 100 picoseconds, such as greater than about 5 picoseconds and less than about 20 picoseconds, and the repetition rate of the individual pulses can be in a range of between about 1 kHz and 4 MHz, such as in a range of between about 10 kHz and 650 kHz. Perforations can also be accomplished with a single "burst" of high energy short duration pulses spaced close together in time. Such pulses can be produced in bursts of two pulses, or more (such as, for example, 3 pulses, 4, pulses, 5 pulses, 10 pulses, 15 pulses, 20 pulses, or more) separated by a duration between the individual pulses within the burst that is in a range of between about 1 nsec and about 50 nsec, for example, 10 to 30 nsec, such as about 20 nsec, and the burst repetition frequency can be in a range of between about 1 kHz and about 200 kHz. (Bursting or producing pulse bursts is a type of laser operation where the emission of pulses is not in a uniform and steady stream but rather in tight clusters of pulses.) The pulse burst laser beam can have a wavelength selected such that the material is substantially transparent at this wavelength. The laser pulse duration may be $10^{-10}$ s or less, or $10^{-11}$ s or less, or $10^{-12}$ s or less, or $10^{-13}$ s or less. For example, the laser pulse duration may be between about 1 picosecond and about 100 picoseconds, or in another embodiment, between about 5 picoseconds and about 20 picoseconds. These "bursts" may be repeated at high repetition rates (e.g. kHz or MHz). The average laser power per burst measured (if burst pulses are utilized) at the material can be greater than 40 microJoules per mm thickness of material, for example between 40 microJoules/mm and 2500 microJoules/mm, or between 500 and 2250 microJoules/mm. For example, for one embodiment when using f 0.1 mm-0.2 mm thick glass one may use 200 µJ pulse bursts to cut and separate the glass, which gives an exemplary range of 1000-2000 µJ/mm. For example, for an examplary 0.5-0.7 mm thick glass, one may use 400-700 µJ pulse bursts to cut and separate the glass, which corresponds to an exemplary range of 570 µJ/mm (400 µJ/0.7 mm) to 1400 µJ/mm (700 µJ/0.5 mm). The perforations may be spaced apart and precisely positioned by controlling the velocity of a substrate or stack relative to the laser through control of the motion of the laser and/or the substrate or stack. In one embodiment, in a single pass, a laser can be used to create highly controlled full line perforation through the material, with extremely little (less than about 75 m, or even less than about 50 m) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (less than about 100 m) and edge chipping occur. These perforations, defect regions, damage tracks, or defect lines are generally spaced from 1 to 25 microns apart (for example, 3-12 microns, or 5-20 microns). According to some embodiments the pulsed laser has laser power of 10 W-150 W and produces pulse bursts with at least 2 pulses per pulse burst. According to some embodiments the pulsed laser has laser power of 10 W-100 W and produces pulse bursts with at least 2-25 pulses per pulse burst. According to some embodiments the pulsed laser has laser power of 25 W-60 W, and produces pulse bursts with at least 2-25 pulses per burst and the periodicity between the defect lines is 2-20 microns, or 2 to 15 microns, or 2-10 microns. The pulse burst laser beam can have a wavelength selected such that the material is substantially transparent at this wavelength. According to some embodiments the pulsed has a pulse duration of less than 10 picoseconds. According to some embodiments the pulsed laser has a pulse repetition frequency of between 10 kHz and 1000 kHz.

Thus, it is possible to create a microscopic (i.e., less than about 1 µm, less than 0.5 nm (for example ≤400 nm, or ≤300 nm) or even less than about 100 nm in diameter (e.g, 50 nm-100 nm)) elongated "hole" (also called a perforation or a defect line) in a transparent material 160 using a single high energy burst pulse. These individual perforations can be created at rates of several hundred kilohertz (several hundred thousand perforations per second, for example). Thus, with relative motion between the source and the material these perforations can be placed adjacent to one another (spatial separation varying from sub-micron to several microns as desired). This spatial separation is selected in order to facilitate cutting. In some embodiments the defect line is a "through hole", which is a hole or an open channel that extends from the top to the bottom of the transparent material 160. Furthermore, the internal diameter of a defect line can be as large as the spot diameter of the laser beam focal line, for example. The laser beam focal line can have an average spot diameter in a range of between about 0.1 micron and about 5 microns, for example 1.5 to 3.5 microns.

To form a focal line 182, a source laser 188 may be transmitted through an optical assembly 184. Suitable optical assemblies, which can optical assemblies can be applied, are described in detail in U.S. Patent Application No. 61/917,092 TITLED "STACKED TRANSPARENT MATERIAL CUTTING WITH ULTRAFAST LASER BEAM OPTICS, DISRUPTIVE LAYERS AND OTHER LAYERS, the teachings of which are incorporated herein by reference in their entirety. For example, an optical assembly 184 positioned in the beam path of the source laser 188 is configured to transform the source laser 188 into a focal line 182, viewed along the beam propagation direction, the laser beam focal line 182 having a length in a range of between 0.1 mm and 100 mm, for example, 0.1 to 10 nm. The laser beam focal line can have a length in a range of between about 0.1 mm and about 10 mm, or between about 0.5 mm and about 5 mm, such as about 1 mm, about 2 mm, about 3 mm, about 4 mm, about 5 mm, about 6 mm, about 7 mm, about 8 mm, or about 9 mm, or a length in a range of between about 0.1 mm and about 1 mm, and an average spot diameter in a range of between about 0.1 micron and about 5 microns. The holes or defect lines each can have a diameter between 0.1 microns and 10 microns, for example 0.25 to 5 microns (e.g., 0.2-0.75 microns). For example, as shown in FIG. 1, a spherical or disc shaped optical assembly 184 may be utilized to focus the source laser 188 and form a focal line 182 of a defined length.

Note that typical operation of such a picosecond laser described herein creates a "burst" 500 of pulses 500A. Each "burst" (also referred to herein as a "pulse burst" 500) contains multiple individual pulses 500A (such as at least 2 pulses, at least 3 pulses, at least 4 pulses, at least 5 pulses, at least 10 pulses, at least 15 pulses, at least 20 pulses, or more) of very short duration. That is, a pulse burst is a "pocket" of pulses, and the bursts are separated from one another by a longer duration than the separation of individual adjacent pulses within each burst. Pulses 500A have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). The energy or intensity of each individual pulse 500A within the burst may not be equal to that of other pulses within the burst, and the intensity distribution of the multiple pulses within a burst 500 often follows an exponential decay in time governed by the laser design. Preferably, each pulse 500A within the burst 500 of the exemplary embodiments described herein is separated in time from the subsequent pulse in the burst by a duration $T_p$ from 1 nsec to 50 nsec (e.g. 10-50 nsec, or 10-30 nsec, with the time often governed by the laser cavity design). For a given laser, the time separation $T_p$ between adjacent pulses (pulse -to- pulse separation) within a burst 500 is relatively uniform (±10%). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each "burst" of pulses (i.e., time separation $T_b$ between bursts) will be much longer (e.g., 0.25≤$T_b$≤1000 microseconds, for example 1-10 microseconds, or 3-8 microseconds). In some of the exemplary embodiments of the laser described herein the time separation $T_b$ is around 5 microseconds for a laser with burst repetition rate or frequency of about 200 kHz. The laser burst repetition rate is relates to the time $T_b$ between the first pulse in a burst to the first pulse in the subsequent burst (laser burst repetition rate=1/$T_b$). In some embodiments, the laser burst repetition frequency may be in a range of between about 1 kHz and about 4 MHz. More preferably, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 k Hz burst repetition rate). The exact timings, pulse durations, and burst repetition rates can vary depending on the laser design, but short pulses ($T_d$<20 psec and preferably $T_d$≤15 psec) of high intensity have been shown to work particularly well.

The energy required to modify or perforate the material (e.g., glass) can be described in terms of the burst energy— the energy contained within a burst (each burst 500 contains a series of pulses 500A), or in terms of the energy contained within a single laser pulse (many of which may comprise a burst). For these applications, the energy per burst can be from 25-750 µJ, more preferably 50-500 µJ, or 50-250 µJ. In some embodiments the energy per burst is 100-250 µJ. The energy of an individual pulse within the pulse burst will be less, and the exact individual laser pulse energy will depend on the number of pulses 500A within the pulse burst 500 and the rate of decay (e.g., exponential decay rate) of the laser. For example, for a constant energy/burst, if a pulse burst contains 10 individual laser pulses 500A, then each individual laser pulse 500A will contain less energy than if the same pulse burst 500 had only 2 individual laser pulses.

Laser "ablative" cutting of thin glasses, as described in some embodiments herein, has advantages that include no minimization or prevention of crack creation at or near the region of ablation and the ability to perform free form cuts of arbitrary shape. It is beneficial to avoid edge cracking and residual edge stress in glass substrates for flat panel displays because flat panel displays have a pronounced propensity to break from an edge, even when stress is applied to the center. The high peak power of ultrafast lasers combined with tailored beam delivery in the method described herein can avoid these problems because the present method is a "cold" ablation technique that cuts without a deleterious heat effect. Laser cutting by ultrafast lasers according to the present method produces essentially no residual s tress in the glass. However, it should be understood that any type of laser may be utilized in the laser processing methods and apparatus described herein.

Still referring to FIG. 1, positioned on top of the support base 120 and between the support base 120 and the transparent material 160 is the laser disruption element 140. In one embodiment, the laser disruption element 140 may be a substantially flat sheet with a substantially flat top surface 142 and bottom surface 144 which correspond with the flat surface of the top surface 122 of the support base 120 and the bottom surface 164 of the transparent material 160, respectively. Generally, the laser disruption element 140 optically disrupts a laser beam 180 transmitted through the transparent material 160 such that the laser beam 180 does not have sufficient intensity (i.e., at the focal line 182) below the laser disruption element 140 to damage the support base 120. For example, optical disruption may include reflection, absorption, scattering, defocusing or otherwise interfering with the laser beam 180. The disruption element 140 may reflect, absorb, scatter, defocus or otherwise interfere with an incident laser beam 180 to inhibit or prevent the laser beam 180 from damaging or otherwise modifying underlying layers in the multilayer stack 100, such as the support base 120.

In one embodiment, the laser disruption element 140 is positioned immediately below the transparent material 160 which is laser processed. Such a configuration is shown in FIG. 1, where the beam disruption element 140 is a substantially flat sheet positioned immediately below the transparent material 160 in which the laser processing described herein will occur. In some embodiments, the laser disruption element 140 may be positioned in direct contact with the support base 120, but in other embodiments another layer of material may be disposed between the support base 120 and the laser disruption element 140. In one embodiment, the laser disruption element 140 may have a thickness as measured from its top surface 142 to its bottom surface 144 from about 0.5 mm to about 3 mm. The edges of the laser disruption element 140 may have a rounded shape with beveled comers, substantially free of sharp comers.

The laser disruption element 140 has different optical properties than the transparent material 160 to be cut by laser processing. For example, the beam disruption element 140 may comprise a defocusing element, a scattering element, a translucent element, or a reflective element. A defocusing element is an interface or a layer comprising a material that prevents the laser beam light 180 from forming the laser beam focal line 182 on or below the defocusing element. The defocusing element may comprise a material or interface with refractive index inhomogeneities that scatter or perturb the wavefront of the laser beam 180. In embodiments where the laser disruption element is a translucent element, the translucent element is an interface or layer of material that allows light to pass through, but only after scattering or attenuating the laser beam 180 to lower the energy density sufficiently to prevent formation of a laser beam focal line 182 in portions of the multilayer stack 100 on the side of the translucent element that are opposite from the laser beam 180.

As shown in FIG. 1, a laser beam 180 may pass into and through the transparent material 160 and contact the top surface 142 of the laser disruption element 140. The laser disruption element 140 may disrupt the laser beam 180 such that the intensity of the laser beam 180 is reduced before it reaches the support base 120. More specifically, the reflectivity, absorptivity, defocusing, attenuation, and/or scattering of the disruption element 140 can be utilized to create a barrier or impediment to the laser radiation. It is not necessary that the absorption, reflection scattering, attenuation, defocusing etc. of the laser beam 180 by the disruption element 140 be complete. The effect of the disruption element 140 on the laser beam 180 may be sufficient to reduce the energy density or intensity of the focal line 182 to a level below the threshold required for cutting, ablation, perforating etc. of the support base 120. In one embodiment, the disruption element 140 reduces the energy density or intensity of the focal line 182 to a level below the threshold needed to damage the support base 120. The laser disruption element 140 may be a layer or an interface and may be configured to absorb, reflect, or scatter the laser beam 180, where the absorption, reflection, or scattering are sufficient to reduce the energy density or intensity of the laser beam 180 transmitted to the support base 120 (or other underlying layer) to a level below that required to cause damage to the support base 120 or other underlying layers.

In one embodiment, the laser disruption element 140 may optically disrupt the laser beam 180 at the top surface 142 of the laser disruption element 140. For example, in one embodiment, the laser disruption element 140 may comprise a film on its top layer 142 or a surface modified top surface 142. For example, the disruption element 140 may comprise a roughened top surface 142 (surface nearest the transparent material 160) which is modified to be substantially rough to scatter incident light. Additionally, if the top surface 142 of the laser disruption element 140 acts to interfere with the laser beam 180, the bulk material of the laser disruption layer may be substantially the same material as the transparent substrate since no focal line 182 is formed below the top surface 142 of the laser disruption element 140. For example, in one embodiment, the transparent material 160 may be glass and the disruption element 140 may be glass. Furthermore, a laser disruption element 140 that has a bulk material transparent to the laser wavelength can transmit the laser and substantially disperse the intensity throughout the bulk material structure of the disruption element 140. In such an embodiment, the laser disruption element 140 is not damaged by a laser beam 180 transmitted through the transparent material 160.

In one embodiment, the laser disruption element 140 may comprise frosted glass, such as, for example, a sheet of frosted glass. The frosted glass, sometimes referred to as iced glass, may be substantially translucent. The relatively rough top surface 142 may act as a translucent element which scatters an incident laser beam 180. The frosted glass may be chemically etched, sand blasted, or otherwise manufactured to have a translucent appearance that operates to disrupt incident light. However, in one embodiment, the frosted glass may be substantially smooth so as to not damage a transparent material 160 which is resting its top surface 142 during laser processing. For example, sand blasted frosted glass may be rough enough to damage a laser processed transparent material 160 by scratching when the transparent material 160 is placed on the laser disruption element 140. However, chemically etched glass may provide suitable optical characteristics while still being sufficiently smooth to not damage the transparent material 160. As used herein, damage to the transparent material 160 means damage that is detectable by a human eye, such as scratches, cuts, or other abrasions.

In one embodiment, the average roughness (Ra) of the top surface 142 may be greater than or equal to about 0.5 microns, greater than or equal to about 0.8 microns, greater than or equal to about 1.0 microns, greater than or equal to about 1.5 microns, or even greater than or equal to about 2.0 microns, As used herein, Ra is defined as the arithmetic average of the differences between the local surface heights and the average surface height and can be described by the following equation:

$$R_a = \frac{1}{n}\sum_{i=1}^{n}|y_i|$$

where Yi is the local surface height relative to the average surface height. In other embodiments Ra may be from about 0.5 microns to about 2.0 microns, from about 0.5 microns to about 1.5 microns, or from about 0.5 microns to about 1.0 micron. For example, in one embodiment, the frosted glass may be EagleEtch® acid etched glass commercially available from EuropTec USA of Clarksburg, W. Va.

In another embodiment, the laser disruption element 140 may comprise a surface film layer that acts to disrupt the laser beam 180 and substantially protect underlying layers such as the support base 120. The optically disrupting film layer may be deposited by thermal evaporation, physical vapor deposition, and/or sputtering, where the thickness may be a function of the wavelength of the utilized laser. The thin films may comprise, without limitation, $MgF_2$, $CaF_2$, poly (methyl methacrylate), PMMI, polycarbonates, styrene-acrylonitrile copolymers, polystyrenes, cyclic olefin polymer, cyclic olefin copolymers, and combinations thereof.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of laser processing a transparent material, the method comprising:
    positioning the transparent material on a carrier; and
    transmitting a laser beam through the transparent material, the laser beam incident on a side of the transparent material opposite the carrier, wherein:
    the transparent material is substantially transparent to the laser beam;
    the carrier comprises a support base and a laser disruption element, wherein a first layer of material is disposed between the support base and the laser disruption element, and wherein the laser disruption element is a chemically etched glass having a rounded shape with beveled corners disposed over a portion of the support base that is greater than a width of the transparent material and less than a width of the support base, and wherein the laser disruption element has a thickness of from about 0.5 mm to about 3 mm; and
    the laser disruption element optically disrupts the laser beam transmitted through the transparent material such that the laser beam does not have sufficient intensity below the laser disruption element to damage the support base; and the laser disruption element comprises at least one of: (i) a diffusive material, (ii) a translucent material, (iii) a material or interface with refractive index inhomogeneities that scatter wavefront of the laser beam.

2. The method of claim 1, wherein the laser disruption element comprises a top surface with average surface roughness (Ra) greater than or equal to about 0.5 microns.

3. The method of claim 2, wherein the average surface roughness (Ra) is greater than or equal to about 1.5 microns.

4. The method of claim 2, wherein the average surface roughness (Ra) is greater than or equal to about 2.0 microns.

* * * * *

UNITED STATES PATENT AND TRADEMARK OFFICE
CERTIFICATE OF CORRECTION

Page 1 of 2

PATENT NO. : 11,697,178 B2
APPLICATION NO. : 15/727083
DATED : July 11, 2023
INVENTOR(S) : Richard Grundmueller et al.

It is certified that error appears in the above-identified patent and that said Letters Patent is hereby corrected as shown below:

On the Title Page

On the page 3, in Column 1, Item (56) under "U.S. Patent Documents", Line 19, delete "Hayashi" and insert -- Hayashi et al. --.

On the page 3, in Column 1, Item (56) under "U.S. Patent Documents", Line 68, delete "Carre" and insert -- Carre et al. --.

On the page 4, in Column 1, Item (56) under "U.S. Patent Documents", Line 72, delete "Buck" and insert -- Blick --.

On the page 4, in Column 1, Item (56) under "U.S. Patent Documents", Line 75, delete "Shah" and insert -- Shah et al. --.

On the page 6, in Column 1, Item (56) under "Foreign Patent Documents", Line 57, delete "2/2014" and insert -- 4/2014 --.

On the page 8, in Column 1, Item (56) under "Other Publications", Line 2, delete "Japanse" and insert -- Japanese --.

On the page 8, in Column 2, Item (56) under "Other Publications", Lines 51-52, delete "Eelectropolishing;" and insert -- Electropolishing; --.

On the page 9, in Column 1, Item (56) under "Other Publications", Line 4, delete "-achitecture," and insert -- -architecture, --.

On the page 9, in Column 1, Item (56) under "Other Publications", Line 29, delete ""Geometricoptics" and insert -- "Geometric optics --.

Signed and Sealed this
Nineteenth Day of December, 2023

Katherine Kelly Vidal
*Director of the United States Patent and Trademark Office*

On the page 9, in Column 1, Item (56) under "Other Publications", Line 38, delete "Egineering" and insert -- Engineering --.

On the page 9, in Column 2, Item (56) under "Other Publications", Line 19, delete "Proccessing" and insert -- Processing --.

On the page 10, in Column 1, Item (56) under "Other Publications", Line 18, delete ""Fresnei" and insert -- "Fresnel --.

On the page 10, in Column 2, Item (56) under "Other Publications", Line 15, delete "pluse" and insert -- pulse --.

On the page 10, in Column 2, Item (56) under "Other Publications", Line 21, delete "Physic" and insert -- Physics --.

In the Specification

In Column 1, Line 7, delete "14/974,181" and insert -- 14/794,181 --.